Aug. 12, 1924.
H. O. RUSSELL ET AL
1,504,711
ELECTRICAL TACHOMETER
Filed March 2, 1922
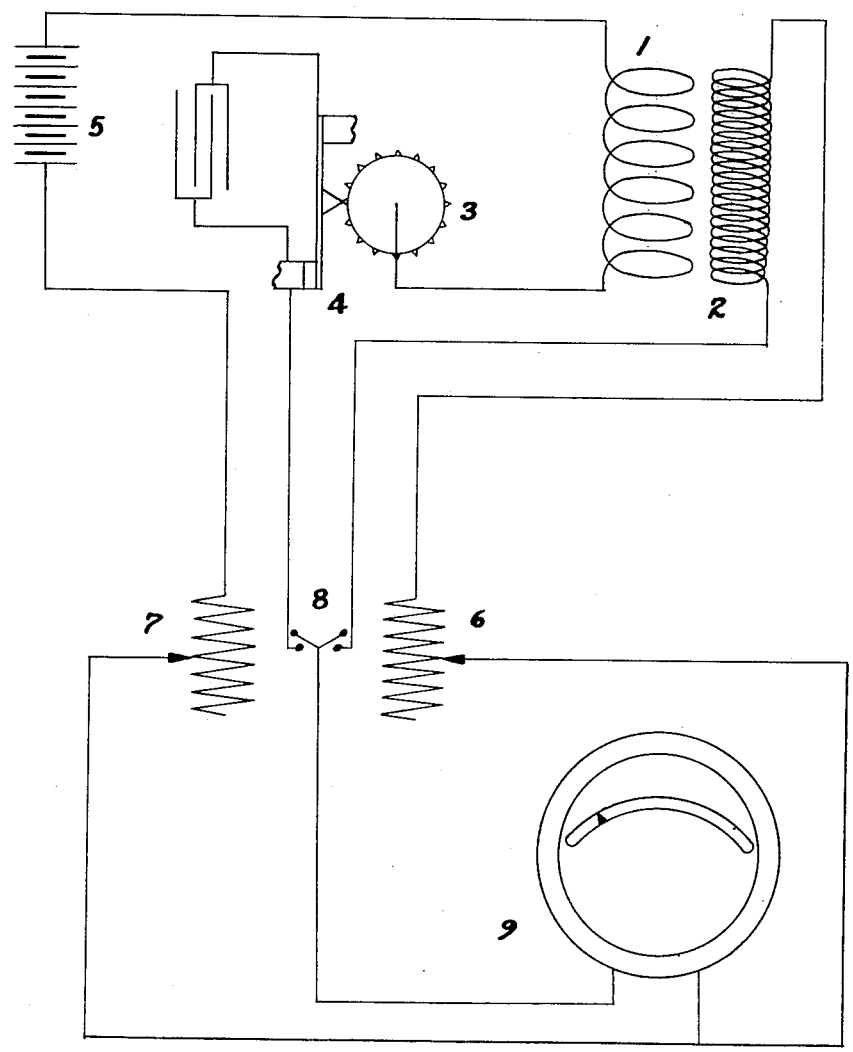

UNITED STATES PATENT OFFICE.

HERBERT O. RUSSELL, OF DETROIT, MICHIGAN, AND EDWARD A. SIPP, OF DAYTON, OHIO.

ELECTRICAL TACHOMETER.

Application filed March 2, 1922. Serial No. 540,575.

*To all whom it may concern:*

Be it known that we, HERBERT O. RUSSELL and EDWARD A. SIPP, citizens of the United States, residing, respectively, at Detroit and Dayton, in the counties of Wayne and Montgomery and States of Michigan and Ohio, have invented certain new and useful Improvements in Electrical Tachometers, of which the following is a specification.

This invention relates to a simple mechanism for measuring electrically the revolutions per minute of any rotary element, particularly the crank shaft of the engine of an airplane, automobile or other motor.

The principle upon which this electrical speed indicator is based is the rate of change of induced current or voltage in a secondary type of induction coil. The mechanism eliminates the use of a flexible shaft or any type of electrical generator and is particularly well adapted to measure the speed of any mechanical rotary element at a great distance therefrom. The device also admits of ready and accurate calibration at any time and for any installation.

With the above and other objects in view, the invention consists in the novel construction, combination and arrangement, herein fully described, illustrated and claimed.

The accompanying drawing is a view partly in elevation and partly in diagram of the improved apparatus.

The mechanism or apparatus consists of a primary and secondary coil 1 and 2 respectively, a multiple-lobe cam and spring actuated breaker points 3 and 4, a source of electrical energy 5, calibrated rheostats 7 and 6, a single pole double throw switch 8, and a voltmeter 9 which is calibrated and graduated in R. P. M. instead of volts.

The operation of the device is dependent upon a constant voltage source of electrical energy and the number of times the primary circuit is opened and closed per unit time. The single pole double throw switch is placed between the primary and secondary circuits to admit of calibration for a definite pre-determined value of voltage. This voltage will be regulated by the rheostat 7 when the current in the primary coil is made at the breaker points 4 and the switch 8 is made to close the primary circuit. The rheostat 6 is placed in the secondary circuit to eliminate the re-calibration of the meter should the length of the secondary coil circuit be changed after an installation has been made. The switch 8 is made to close the secondary circuit and open the primary circuit when the pre-determined voltage has been fixed, the meter calibrated and the device ready for final operation. We are thus enabled to obtain a balanced resistance in the primary and secondary circuits.

What we claim is:

In an electrical tachometer, a primary electric circuit, a constant voltage source of electrical energy in said circuit, circuit make and break means in said circuit, an electrically controlled meter in said circuit graduated in R. P. M., a rheostat also in said circuit, a secondary circuit including said meter and a second rheostat, and a double-throw switch controlling said circuits.

In testimony whereof, we affix our signatures.

HERBERT O. RUSSELL.
EDWARD A. SIPP.